United States Patent
Shikata et al.

(10) Patent No.: US 6,497,540 B1
(45) Date of Patent: Dec. 24, 2002

(54) ENDMILL AND CUTTING METHOD

(75) Inventors: Hiroshi Shikata, Yokohama; Shoichi Kishita, Zama; Nobuhisa Ujiie, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/244,415

(22) Filed: Feb. 4, 1999

(30) Foreign Application Priority Data

Feb. 5, 1998 (JP) .......................... 10-024481

(51) Int. Cl.$^7$ ................................ B23C 5/26
(52) U.S. Cl. ..................... 409/234; 407/53; 407/54; 408/59; 408/239 A; 409/136
(58) Field of Search .................. 407/32, 40, 54, 407/53, 57; 408/59, 239 A, 239 R, 233; 409/232, 234, 233, 136

(56) References Cited

U.S. PATENT DOCUMENTS

| | | | |
|---|---|---|---|
| 990,230 A | * 4/1911 | Cornlius | 407/53 |
| 1,354,097 A | * 9/1920 | Fitzsimmons | 407/53 |
| 1,360,016 A | * 11/1920 | Porter | 407/53 |
| 2,360,425 A | * 10/1944 | Kinzbach | 407/53 |
| 3,037,264 A | * 6/1962 | Mossberg | 407/54 X |
| 4,579,488 A | * 4/1986 | Griffin | 409/136 |
| 4,744,706 A | * 5/1988 | Marshall | 408/239 A |
| 4,929,131 A | * 5/1990 | Allemann | 408/233 |
| 5,064,322 A | * 11/1991 | Pisani | 409/234 |
| 5,348,426 A | * 9/1994 | Krupp | 407/40 |
| 5,391,022 A | * 2/1995 | Nakayama et al. | 407/233 |
| 5,425,603 A | * 6/1995 | Dutschke et al. | 407/40 |
| 5,626,446 A | 5/1997 | Ching | |
| 5,899,642 A | * 5/1999 | Berglöw et al. | 407/54 X |
| 6,053,670 A | * 4/2000 | Schmid | 407/54 X |

FOREIGN PATENT DOCUMENTS

| | | | | |
|---|---|---|---|---|
| AU | 201056 | * | 4/1955 | 407/54 |
| DE | 3530745 | * | 3/1987 | 407/53 |
| DE | 195 11 551 A1 | | 10/1996 | |
| EP | 202211 | * | 11/1986 | 408/59 |
| FR | 1260127 | * | 3/1961 | 407/54 |
| FR | 2 531 887 | | 8/1984 | |
| GB | 627279 | * | 8/1949 | 407/53 |
| GB | 1195299 | * | 6/1970 | 408/59 |
| JP | 9-267211 | | 10/1997 | |
| JP | 10-249264 | * | 9/1998 | 407/53 |
| JP | 10-309616 | * | 11/1998 | 407/53 |
| NL | 136462 | * | 7/1979 | 407/53 |
| SU | 260360 | * | 12/1969 | 408/59 |
| SU | 1253746 | * | 2/1986 | 407/53 |
| SU | 1355378 | * | 11/1987 | 407/53 |
| SU | 1756033 | * | 8/1992 | 408/59 |
| WO | WO 95/25612 | | 9/1995 | |

* cited by examiner

Primary Examiner—William Briggs
(74) Attorney, Agent, or Firm—Oblon, Spivak, McClelland, Maier & Neustadt, P.C.

(57) ABSTRACT

An endmill having a shank and a milling head having cutting teeth continuous from a peripheral surface toward a forward tip face, wherein the endmill has a through hole extending from the forward tip face of the head to the shank past the head along a rotation axis of the endmill. The head and shank comprise separate component parts and the head is mounted on the shank by inserting a screw member from the tip end face into the hole and fixing the screw member to the shank.

3 Claims, 4 Drawing Sheets

ENDMILL AND CUTTING METHOD

BACKGROUND OF THE INVENTION

The present invention relates to an endmill and a cutting method using the endmill and, in particular, a cutting method using a ball endmill and radius endmill.

In general, an endmill is mounted on a main spindle of an NC machining system such as a machining center, and used to create a surface having a three-dimensional complicated shape such as a surface of a metal mold. The endmill is one kind of a milling cutter. Of the endmill, a ball endmill and radius endmill have teeth at a forward tip end in a manner to be continuous from an outer peripheral surface thereof to a tip end and that the tip end also serves a cutting end.

The endmill of such kinds are broadly classified into a solid ball endmill comprised of a single unitary tool of a shank and teeth and a tip-fixed type tool with a teeth-constituting tip brazed or bolted to a tool body.

However, conventional ball endmill or radius endmill has problems as will be set out below.

First, since the cutting speed becomes a substantially zero to a very low speed in the neighborhood of a rotation center of the tip end, there is a risk that no better cutting will be done and a work surface be scraped or peeled.

Further, the pitch of the cutting teeth is narrowed in the neighborhood of the rotation center of the tip end and there is a risk that no better removal of chips will be done and a work surface be damaged.

Further, the solid endmill is expensive because this tool as a whole is made of a rare material. And there is room for improvement in the savings of materials used.

Still further, in a tip-fixed type endmill, for example, plural tips are mounted on the tool body and rotated at high speeds, thus resulting in a variation in the mounting accuracy of the tip end, as well as in the shaping accuracy of the tip itself, exerting a greater adverse effect on the machining accuracy.

The tip-fixed type ball endmill is larger in size and there is a limitation on the rotation speed and hence an inherent limitation on a range in which cutting is made.

BRIEF SUMMARY OF THE INVENTION

The present invention is achieved so as to eliminate drawbacks of a conventional endmill.

The present invention provides an endmill having a shank and a milling head having cutting teeth continuous from a peripheral surface toward a forward tip face, characterized in that the endmill has a through hole extending from the forward tip face of the head to the shank past the head along a rotation axis of the endmill.

A main embodiment of the present invention provides an endmill characterized in that the head and shank comprise separate component parts and the head is mounted on the shank by inserting a screw member from the tip end face into the hole and fixing the screw member to the shank.

In one embodiment, an endmill is provided characterized in that the screw member is completely buried in the head.

In one embodiment, an endmill is provided characterized in that the head has a means for preventing any displacement from the shank.

In one embodiment, an endmill is provided characterized in that the head further has cutting teeth from the outer peripheral surface to a rear end face.

In one embodiment, an endmill is provided characterized in that the head has the forward end face and rear end face formed in a symmetrical way to allow either of cutting teeth on the forward end face side and cutting teeth on the rear end face side to be used.

In one embodiment, an endmill is provided characterized in that the screw member has a discharge hole for discharging a coolant.

In one embodiment, an endmill is provided characterized in that the shank has a diameter smaller than that of the head.

An endmill according to another main embodiment of the present invention, characterized in that the hole extends through the shank. Here, the hole is a coolant passageway for discharging a coolant. In another embodiment, a screw member inserted into the hole to improve rigidity to the ball endmill.

In one embodiment, an endmill is provided characterized in that the cutting teeth is so shaped as to define a curve of a predetermined curvature radius about any given center point in the head.

In one embodiment, an endmill is provided characterized in that the point is located on the rotation axis of the endmill and a sector angle $\alpha$ connecting an edge of the through hole at the forward end side of the head to the center point of the cutting teeth is $10° \leq \alpha \leq 90°$.

In one embodiment, the cutting tooth has a tip of an ultra-hard sintered body.

In one embodiment, an endmill is provided a coolant discharge passageway provided in the head and shank to allow a coolant to be discharged from between the cutting teeth.

In another aspect of the preset invention, a method is provided for cutting a work with the use of an endmill having a shank and a head having cutting teeth continuous from an outer peripheral surface to a forward end face and a passageway extending from a forward end face of the head past the head to the shank along a center axis of the endmill, characterized by cutting a work surface in a manner to tilt an axis of the endmill at a predetermined angle to the work surface.

The other features and advantages of the present invention will be well understood by referring to those embodiments as will be explained in more detail below.

Further, additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the accompanying drawing.

A first embodiment will be described below.

Figure 1:
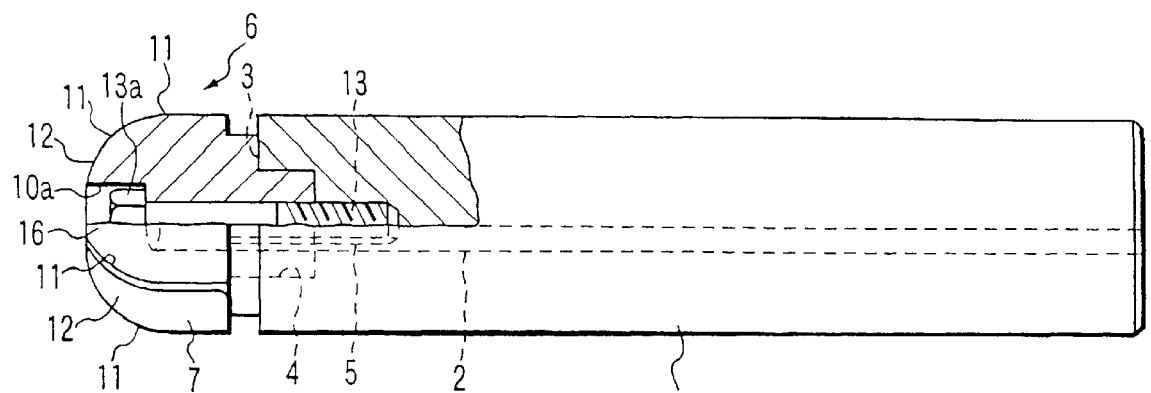
FIG. 1 is a front view, partly in cross-section, showing a first embodiment according to the present invention.
Figure 2:
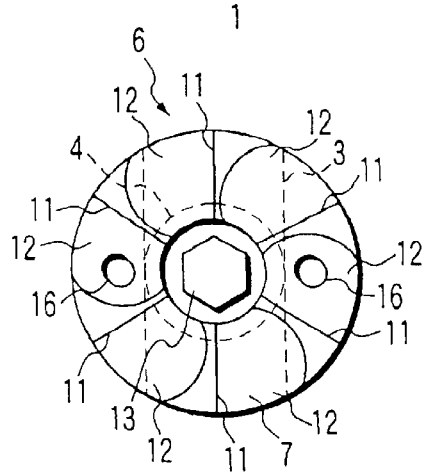
FIG. 2 is a side view showing the first embodiment.
Figures 3A, 3B, 3C:
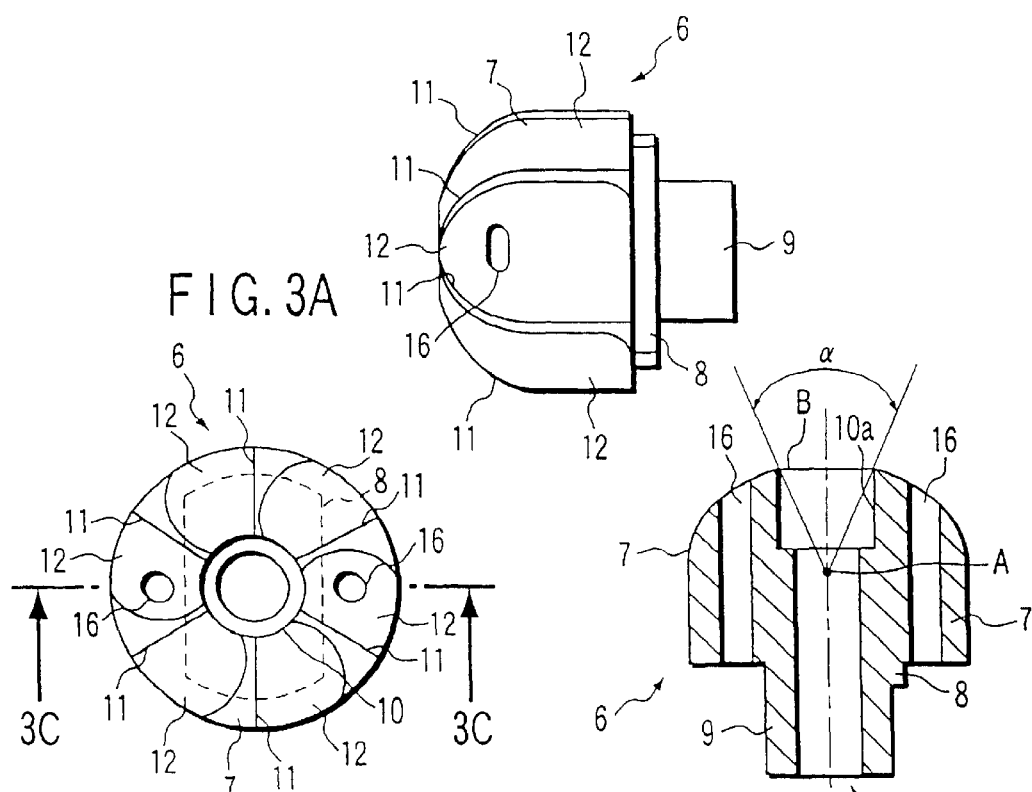
FIGS. 3A to 3C, each, show a practical form of a head of the embodiment.

A ball endmill as shown in FIG. 1 comprises a cylindrical 1 detachably mounted on a main spindle of a machining center for example and a milling head 6 mounted on a forward end of the shank 1. FIGS. 1 and 2, each, show a combined state of the head 6 and shank 1 and FIGS. 3A to 3C show the head 6 only.

As shown in FIGS. 1 and 2, the shank 1 has an axially penetrating coolant passageway 2 at proper two places in its diameter direction. Further, a cotter seat 3 and cylindrical recess 4 are provided in a forward end face of the shank 1 so as to align with the head 6 which is mounted on the shank 1.

As indicated by dotted lines in FIG. 2, the cotter seat 3 is provided in the diameter direction of the shank member 1 and has a predetermined width. By the cotter seat 3, the shank member 1 and head 6 are prevented from being rotated relative to each other. The cylindrical recess 4 is provided coaxial with the center axis of the shank 1 and defines a circular recess smaller in diameter than the cotter seat 3 and deeper than the cotter seat 3. The cylindrical recess 4 aligns the axis of the head 6 with that of the shank 1. A screw hole 5 is opened in a bottom surface wall of the cylindrical recess 4 and extends along the rotation center axis of the shank 1. The shank 1 is made of, for example, a quenchable steel series alloy such as a SCM440 steel.

The head 6 is comprised of an integral component part of an ultra-hard tool material such as a cemented carbide alloy. As shown in FIGS. 3A and 3B, the head 6 has a plurality of ball teeth 7 provided at a predetermined pitch along a circumferential direction. The ball teeth 7 are of a straight type, not of a twisted type and, as shown in FIG. 3C, such that they describe a circular arc with a predetermined radius around a center point A on a rotation center axis.

Further, as shown in FIG. 3C, a stepped bolt hole 10 is formed on the rotation center axis of the head 6 with its large-diameter section 10a side opened at its tip end face of the ball teeth 7 side. The diameter of the large-diameter section 10a is so determined that an angle α between an edge B of the large-diameter section 10a and the center point A on the rotation center axis of the ball teeth is 10° to 90°, more preferably 20° to 45°. In the present embodiment, the angle α is so formed as to define an angle of 41°.

Further, a cotter 8 fitted in the cotter seat 3 of the shank 1 and a projection 9 of the head 6 fitted in the cylindrical recess 4 of the shank 1 are provided on a back side of the head 6 to align the head 6 with the shank 1.

Coolant hole 16 are provided in the head 6 to communicate with the coolant passageways 2 in the shank 1. The coolant hole 16 are opened in tip pockets 12 defined between the ball teeth 7.

When the head 6 is to be mounted to the shank 1, the projection 9 of the head 6 is aligned with the recess 4 in the forward end portion of the shank 1, and the head 6 and shank 1 are relatively rotated to position the cotter 8 relative to the cotter seat 3. And, in this state, the head 6 is fitted to the shank 1. The projection 9 and recess 4 may have a short taper.

After, in this way, the head 6 is exactly aligned with, and fitted to, the shank 1, a hexagonal head-equipped bolt 13 is inserted via the large-diameter section 10a of the bolt hole 10 in the head 6 into the screw hole 5 in the shank 1 as shown in FIG. 1. In a state in which the head 6 has been completely threaded into the shank 1, the head 13a of the bolt 13 is placed in a retracted state at the bolt hole 10 of the head 6 as shown in FIG. 1, that is, in a state in which the head 13a of the bolt 13 is completely sunken within the head 6 of the ball endmill. It is to be noted that the bolt 13 is threaded in a direction to be tightened by the rotation of the ball endmill. In the case where, for example, the ball endmill is rotated in a right-handed direction, then use is made of a right-handed screw.

Figure 4:
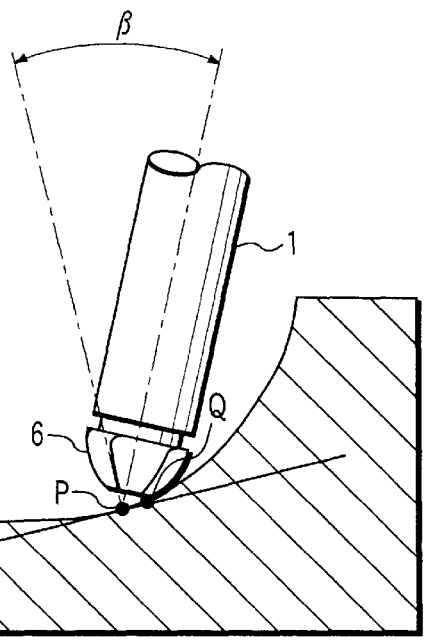
FIG. 4 is an explanative view showing a state in which the embodiment of the present invention is used.

In use, the ball endmill thus structured has a rear end portion of its shank 1 fixed to the main spindle of, for example, a machining center (3-, 4- or 5-axis controlled machining center). FIG. 4 shows a state in which cutting is made using this ball endmill. In the case where cutting is made on the machining center, programming is so made as to have the center axis of the ball endmill tilted at an angle of β relative to a cutting face including a cutting point Q. In this Figure, by utilizing an imaginary apex P on the tip end of the ball endmill from the standpoint of a convenience, that angle β between a normal line at the apex P and the center axis of the ball endmill is set at an angle of above ½ the above-mentioned angle α, that is, at an angle of about 5°≦β≦90°, desirably an angle of 10°≦β≦90°. In this embodiment, that tilt angle used is 10°.

It is to be noted that an NC program may be run using the cutting point Q in place of the crosspoint P. The difference between these points is slight and there is no substantial inconvenience in using either one of these.

One of the advantages of the ball endmill thus constructed lies in that a dent (10a) is provided near the central area of a tip end of the head 6 which involves a less cutting power and the bolt 13 can be fixed using that area.

That is, the shank member 1 and head 6 can be made as separate component parts and can be fixed to each other by a single bolt 13. Since, by doing so, only the head 1 can be made of an expensive material, a yield in material is improved.

Further, the head 6 can be fixed to the shank 1 by the single bolt 13 provided at the rotation center axis and thus it is possible to obtain a ball endmill of a smaller diameter. This ensures a better balance of the tool and hence a high-speed cutting.

In a conventional ball endmill, it is most difficult to manufacture a ball teeth near a rotation center. In the present invention, a space is created at that control area of the tool and it is easier to form ball teeth 7. Moreover, many ball teeth 7 can be provided in a denser, mutually closer way, thus improving a cutting performance.

Further, by providing the coolant passageways 2 and 16 in the ball endmill, it is possible to directly supply a coolant from the inside of the tool to the cutting edges and, in comparison with an ordinary structure supplying a coolant from an outside, a prominent advantage can be exhibited from the ball endmill of the present invention.

Although, in the above-mentioned embodiment, six straight edges are provided as the ball teeth 7, twisted ones may be used instead and the number of teeth used is not restricted thereto.

Although, in the above-mentioned embodiment, as the ultra-hard tool material use is made of the cemented carbide alloy, use may be made of a cement, ceramics and covered ultra-hard alloy.

Figure 5A:
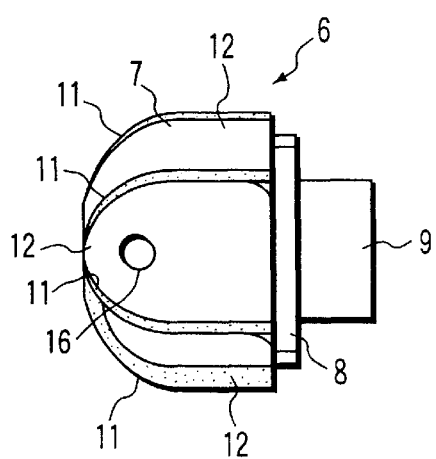
FIGS. 5A and 5B, each, show a practical form of a head in a second embodiment of the present invention.
Figure 5B:
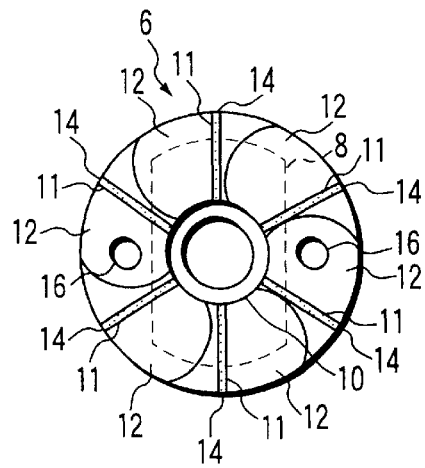

FIGS. 5A and 5B show a second embodiment of the present invention with the same reference numerals employed to designate parts or elements corresponding to those in FIGS. 3A to 3C and an explanation made only on those different parts or elements.

In the second embodiment, a head 6 made of an ultra-hard tool material is of such a type that a stepped cut section is provided at those areas corresponding to ball teeth 7 and, in this case, an ultra-high pressure sintered tip 14 such as a sintered diamond is joined to the stepped cut section to provide ball teeth 11.

If the ball teeth is of such a structure, it is possible to highly efficiently use them on a high-speed cutting area where the characteristic of the ultra-high sintered tip end 14 is utilized.

Figure 6:
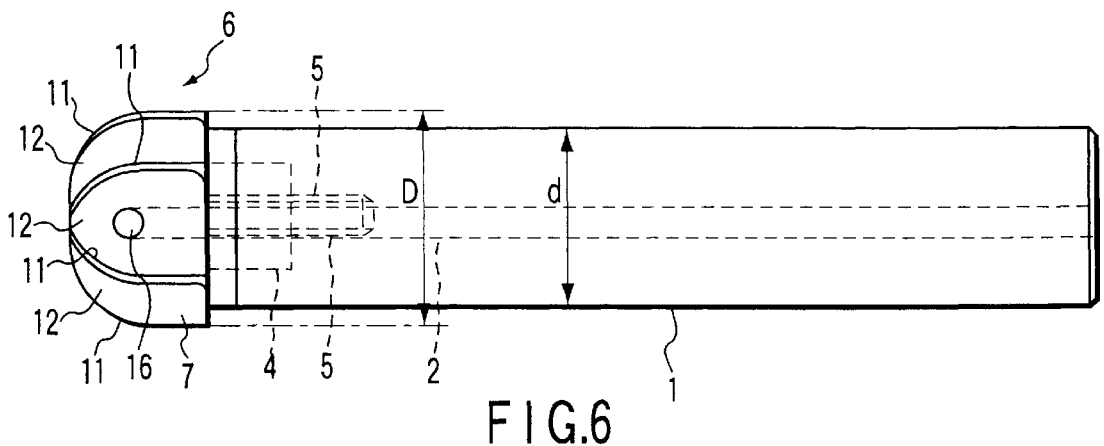
FIG. 6 is a front view showing a third embodiment of the present invention.

FIG. 6 shows a third embodiment of the present embodiment with the same reference numerals employed to designate parts or elements corresponding to those in FIG. 1 and an explanation made only on those different parts or elements.

In the third embodiment, a diameter d of a shank 1 is so formed as to be smaller than a diameter D of a head 6 as shown in FIG. 6.

This structure ensures less risk of interference between a work and a shank 1 and provides an easier-to-use ball endmill.

Figure 7:
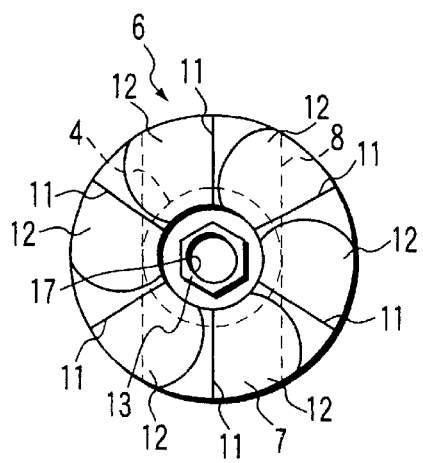
FIG. 7 is a side view showing a head in a fourth embodiment of the present invention.

FIG. 7 shows a fourth embodiment of the present embodiment with the same reference numerals employed to designate parts or elements corresponding to those in FIG. 2 and an explanation made only on those different parts or elements.

In the fourth embodiment, a ball endmill is of such a type that a coolant passageway 17 penetrates a head 6, hexagonal head-equipped bolt 13 and axial center of a shank 1.

This structure ensures a better rotation balance of a resultant tool and hence a suitable application for use at high-speed rotations.

Figure 8:
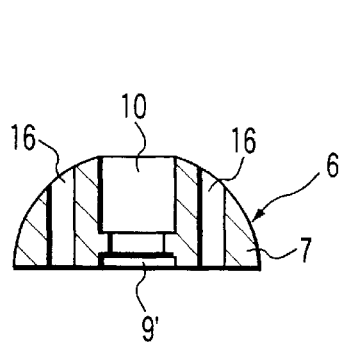
FIG. 8 is a cross-sectional view showing a head in a fifth embodiment of the present invention.

FIG. 8 shows a fifth embodiment of the present invention with the same reference numerals employed to designate parts or elements corresponding to those shown in FIG. 3C and an explanation given only on those different parts or elements.

In the fifth embodiment, a ball endmill is of such a type that the projection 9 of the head 6 and recess 4 of the shank member 1 in the first embodiment are replaced, respectively, by a recess 9' of a head and projection (not shown) of a shank 1. Further, the fifth embodiment is not equipped with a cotter and cotter seat.

The head member 6, being so structured, becomes a compact, lightweight unit and a rare material of which the head is made can be more saved than otherwise.

Figure 9:
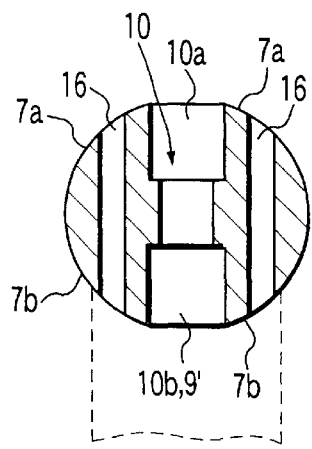
FIG. 9 is a cross-sectional view showing a head in a sixth embodiment of the present invention.

FIG. 9 shows a sixth embodiment of the present invention. In FIG. 9, the same reference numerals are employed to designate parts or elements corresponding to those shown in FIG. 3C and, for brevity in explanation, any further explanation is omitted except for different parts or elements.

A head of the sixth embodiment is so formed as to have a substantially spherical shape. The head has mutually continuous ball teeth 7a and 7b at opposite ends. A bolt hole 10 has large-diameter sections 10a and 10b at its opposite ends. One of these large-diameter sections 10b serves the same function as that of the recess 9' of FIG. 8.

According to such a structure, the mutually continuous ball teeth 7a and 7b can both be mounted to the shank member 1 and cutting can be made at either side. Further, it is desired that the diameter of the shank 1 with the head 6 mounted thereon be made smaller than the outer diameter of the head 6 to allow the ball teeth 7a (7b) to be used in a broader range.

Figure 10:
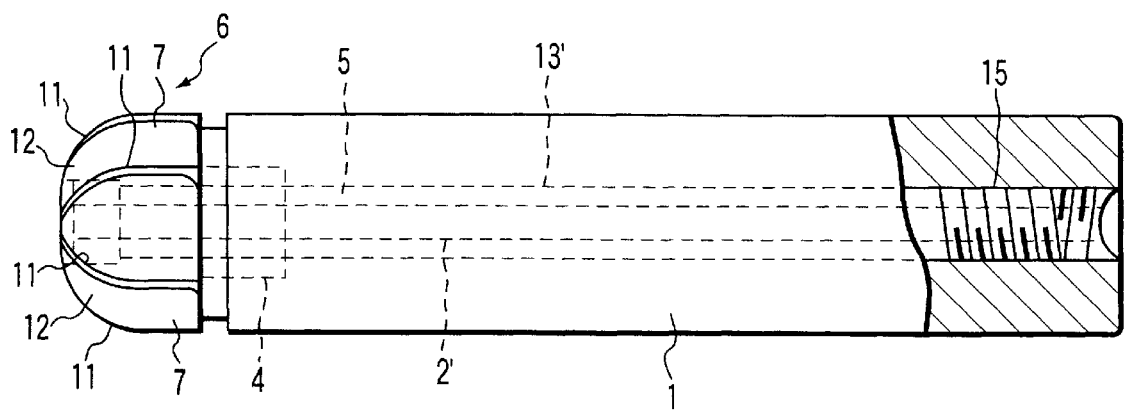
FIG. 10 is a front view, partly in cross-section, showing a seventh embodiment of the present invention.

FIG. 10 shows a seventh embodiment of the present invention. In FIG. 10, the same reference numerals are employed to designate parts or elements corresponding to those shown in FIG. 1 and any further explanation is omitted, for brevity's sake, except for different parts or elements.

In the seventh embodiment, use is made of a bolt 13' having a length corresponding to a substantially whole length of a shank member 1. Further, the shank 1 has a through hole 5 over its full length and an internal thread section 15 is provided in the other end portion of the through hole 5 with the bolt 13' threaded therein. And the bolt 13' is inserted from the forward end of the head 6 and threaded into the internal thread section 15 in the other end portion of the shank 1 to fix the head 6 to the shank 1. A coolant passageway 2' is provided in the bolt 13', and through the coolant passageway 2', a coolant is supplied to a cutting face.

According to this structure, by fastening the bolt 13' into the internal thread section, the forward end of the head 6 and other end portion (15) of the shank 1 are pulled toward each other in a mutually tensioned direction whereby a compression force acts on the ball endmill along an axial direction to provide improved rigidity to the ball endmill. Note that, even where the endmill is a type having an integral unit of a shank 1' and head 6' (as shown in FIG. 11), the use of the bolt 13' provides improved rigidity to the ball endmill.

In such structure, a coolant can be supplied to a head 6 in the same way as in the fourth embodiment and it is possible to obtain a ball endmill assuring a well-balanced rotation.

Figure 11:
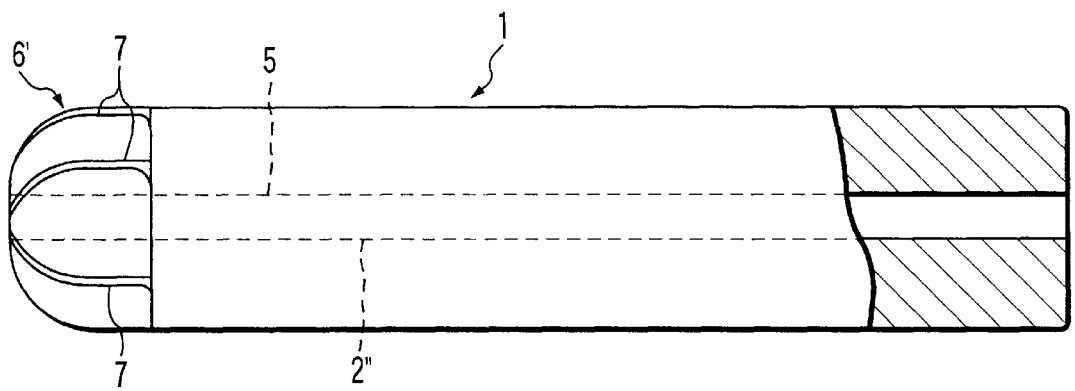
FIG. 11 is a front view, partly in section, showing an eighth embodiment of the present invention.

FIG. 11 shows an eighth embodiment of the present invention.

A ball endmill of this embodiment has an integral unit of a shank 1' and head 6' having a coolant passageway 2" extending therethrough along its rotation axis.

Figure 12:
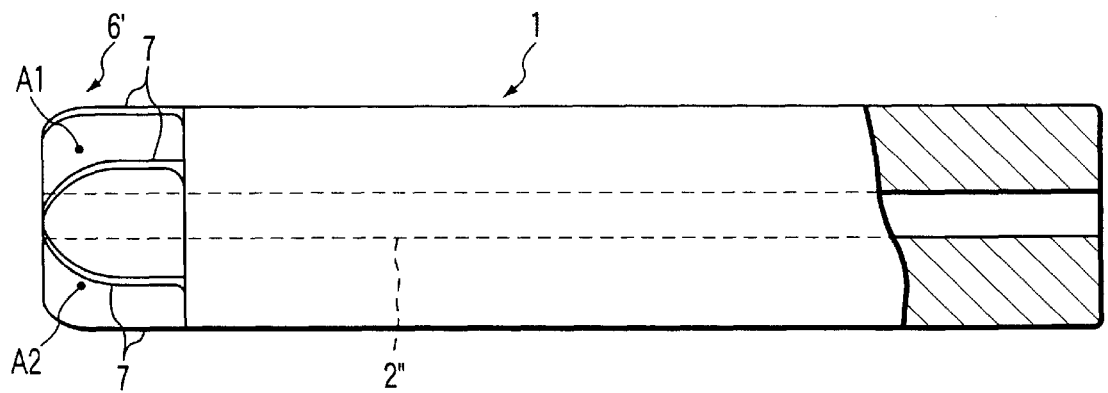
FIG. 12 is a front view showing a variant of the head.

The present invention is not restricted to the above-mentioned embodiment and various changes or modifications can be made without departing from the spirit and scope of the present invention. For example, cutting teeth 7 of the head 6 need not be so defined as to have a circular arc with a point A as an origin as shown in FIG. 3C and may be of such a type as to have circular arcs one with a point A1 as an origin and one with a point A2 as an origin as shown in FIG. 12. This type of endmill having cutting teeth 7' as shown in FIG. 12 is referred to as a radius endmill.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An endmill to be adapted to a machining center, comprising:

a shank configured to be fixed to the machining center;

a milling head having cutting teeth continuous from an outer peripheral surface of the milling head toward a forward tip face of the milling head; and a through hole extending from the forward tip face of the head to the shank past the head along a rotation axis of the endmill;

wherein:

the head and shank comprise separate component parts and the head is mounted on the shank by inserting a screw member from the tip end face into the hole and fixing the screw member to the shank;

the through hole has a coolant passageway for discharging a coolant; and a sector angle $\alpha$ connecting an edge of the through hole at the forward end side of the head to the center point of the cutting teeth is $10° \leq \alpha \leq 90°$ when viewed in a longitudinal section including the rotation axis of the endmill.

2. An endmill according to claim 1, wherein the cutting teeth are shaped such that a curve of a predetermined curvature radius about any given center point in the head is defined when viewed in a longitudinal section including the rotation axis of the endmill.

3. An endmill according to claim 1, wherein the screw member has a discharge hole for discharging the coolant via the through hole.

* * * * *